United States Patent
Sun et al.

(10) Patent No.: US 10,297,069 B2
(45) Date of Patent: May 21, 2019

(54) COMPUTER-READABLE RECORDING MEDIUM, SHORTEST PATH DETERMINING METHOD, AND INFORMATION PROCESSING DEVICE

(71) Applicant: FUJITSU LIMITED, Kawasaki-shi, Kanagawa (JP)

(72) Inventors: Guoping Sun, Kawasaki (JP); Hiroshi Tanaka, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 15/615,454

(22) Filed: Jun. 6, 2017

(65) Prior Publication Data
US 2018/0012396 A1    Jan. 11, 2018

(30) Foreign Application Priority Data
Jul. 8, 2016 (JP) .................................. 2016-136429

(51) Int. Cl.
*G06T 15/08* (2011.01)
*G06T 7/62* (2017.01)
*G06F 17/50* (2006.01)

(52) U.S. Cl.
CPC ................ *G06T 15/08* (2013.01); *G06T 7/62* (2017.01); *G06F 17/5009* (2013.01); *G06F 17/5095* (2013.01); *G06F 2217/34* (2013.01); *G06F 2217/36* (2013.01)

(58) Field of Classification Search
None
See application file for complete search history.

(56) References Cited

U.S. PATENT DOCUMENTS

| | | | |
|---|---|---|---|
| 2006/0247902 A1 | 11/2006 | Rourke | |
| 2007/0103464 A1 | 5/2007 | Kaufman et al. | |
| 2011/0205583 A1* | 8/2011 | Young | B29C 67/0088 358/1.15 |
| 2015/0169796 A1 | 6/2015 | Sato et al. | |
| 2015/0278602 A1* | 10/2015 | Sakashita | G06K 9/00624 382/103 |
| 2017/0095226 A1* | 4/2017 | Tanaka | A61B 17/3403 |

FOREIGN PATENT DOCUMENTS

| | | |
|---|---|---|
| JP | 08-153214 | 6/1996 |
| JP | 2001-014492 | 1/2001 |
| JP | 2006-277672 | 10/2006 |
| WO | 2004/104939 A1 | 12/2004 |

OTHER PUBLICATIONS

Extended European Search Report dated Dec. 6, 2017 for corresponding European Patent Application No. 17175442.7, 10 pages.

* cited by examiner

*Primary Examiner* — Andrew G Yang
(74) *Attorney, Agent, or Firm* — Fujitsu Patent Center

(57) ABSTRACT

A computer readable recording medium stores a program that causes a computer to execute a process. The process includes: voxelizing a three-dimensional model to generate a voxel model; performing inversion processing on an area in three-dimensional space including the generated voxel model to invert an area set as voxels and an area not set as voxels; extracting an area including specific two points from the area set as voxels after the inversion processing, the area to be extracted allowing center of a specific sphere having a predetermined size to pass anywhere therein; determining a shortest path between the specific two points within the extracted area; and outputting the shortest path.

5 Claims, 10 Drawing Sheets

FIG.4
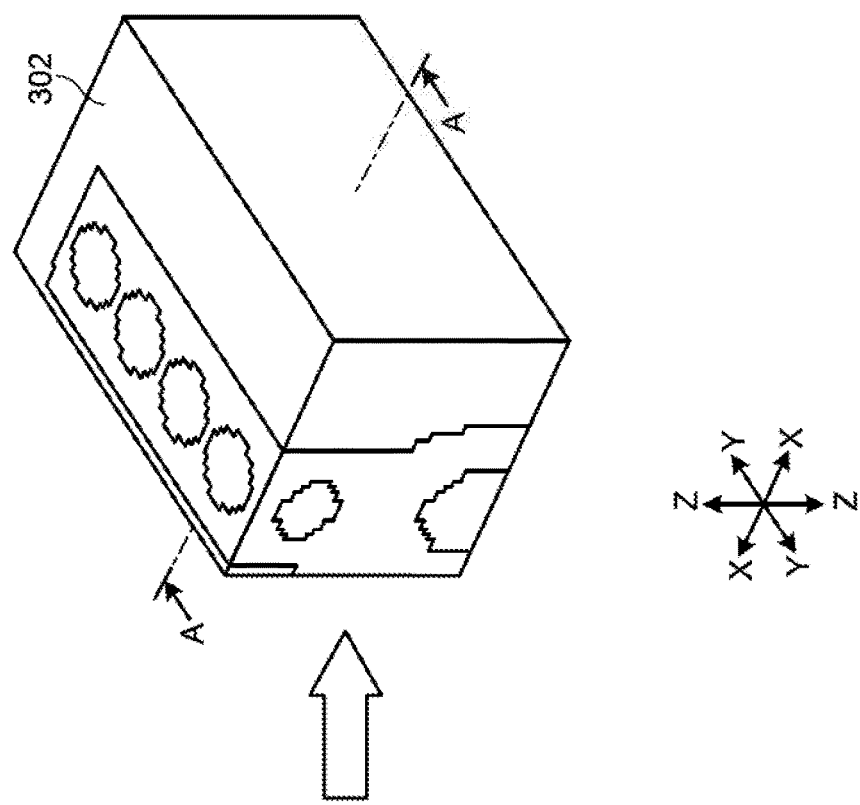
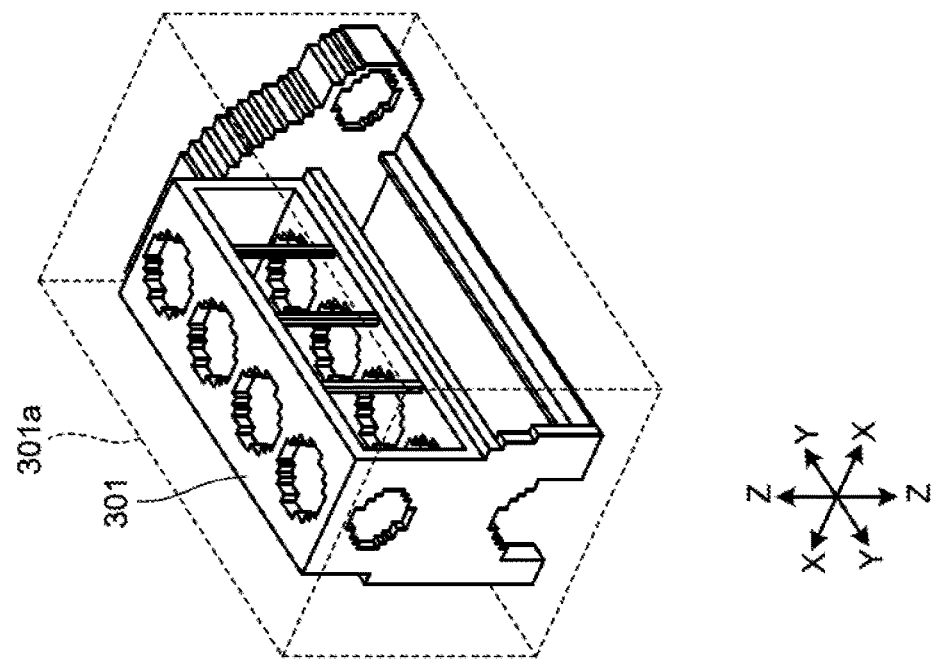

FIG.7A
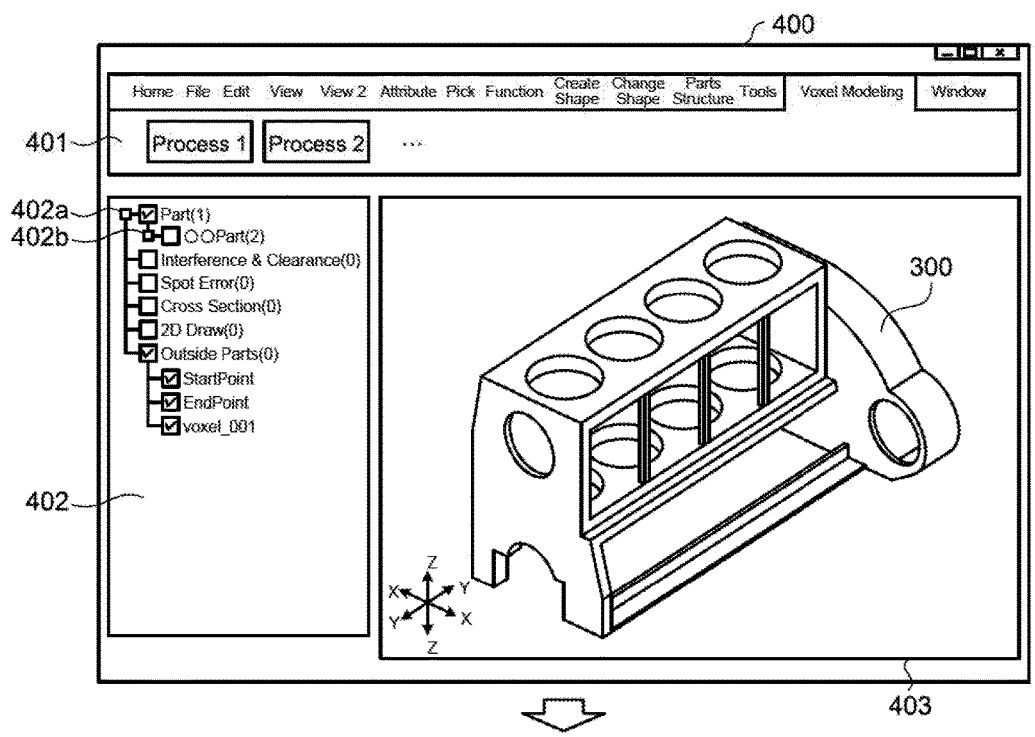
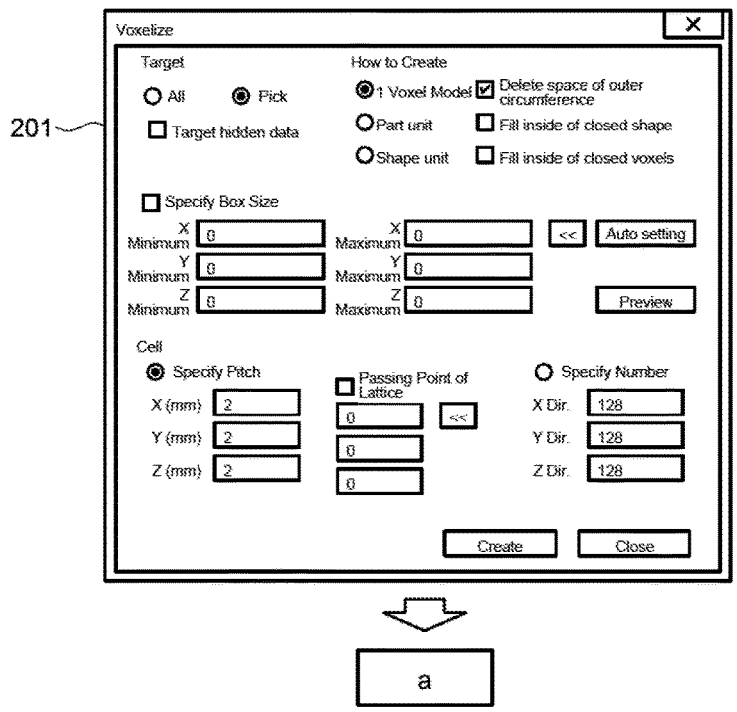

COMPUTER-READABLE RECORDING MEDIUM, SHORTEST PATH DETERMINING METHOD, AND INFORMATION PROCESSING DEVICE

CROSS-REFERENCE TO RELATED APPLICATION

This application is based upon and claims the benefit of priority of the prior Japanese Patent Application No. 2016-136429, filed on Jul. 8, 2016, the entire contents of which are incorporated herein by reference.

FIELD

The embodiment discussed herein is related to a computer-readable recording medium, a shortest path determining method, and an information processing device.

BACKGROUND

Computer Aided Engineering (CAE) is known as an example of technology to support prior examination of product design, manufacturing, and process design by utilizing computer technology. In the CAE field, by performing simulation based on model data of three-dimensional shape of a product such as an automobile as a target to be designed, it is possible to verify the assembly process etc. at the design stage of the target product.

Patent Literature 1: Japanese Laid-open Patent Publication No. 2006-277672

SUMMARY

According to an aspect of an embodiment, a non-transitory computer readable recording medium stores a shortest path determining program that causes a computer to execute a process. The process includes: voxelizing a three-dimensional model to generate a voxel model; performing inversion processing on an area in three-dimensional space including the generated voxel model to invert an area set as voxels and an area not set as voxels; extracting an area including specific two points from the area set as voxels after the inversion processing, the area to be extracted allowing center of a specific sphere having a predetermined size to pass anywhere therein; determining a shortest path between the specific two points within the extracted area; and outputting the shortest path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram for explaining inversion;

FIG. 7A is an explanatory diagram for explaining display screens;

DESCRIPTION OF EMBODIMENT

Preferred embodiments of the present invention will be explained with reference to accompanying drawings. In the embodiments, the same reference signs are assigned to components having the same functions and redundant explanation is omitted. The computer-readable recording medium, the shortest path determining method, and the information processing device explained in the following embodiments are only one examples, and are not limited to the embodiments. In addition, the embodiments as follows may be appropriately combined with each other within a range not contradictory.

In the conventional technology, there is a case in which a processing load increases when calculating a shortest path between two points passing through a free space of the product as the target to be designed from the model data of the three-dimensional shape.

For example, in manufacturing places of automobiles etc., products such as electrical cables may be outsourced to other company so that the electrical cable is passed through a free space of the product. In such a case where the products are outsourced to other company, the free space is specified from the model data for the three-dimensional shape of the product, and the shortest path along which the electrical cable is passed in the specified free space is calculated. However, in the product such as an automobile, surface elements indicating the three-dimensional shape of the product are each fine, thereby leading to an increased number of elements. This results in increased processing load for calculating the shortest path.

Accordingly, it is an object in one aspect of an embodiment to provide a computer-readable recording medium, a shortest path determining method, and an information processing device capable of easily calculating the shortest path between two points passing through a free space from the three-dimensional shape model data.

Figure 1:
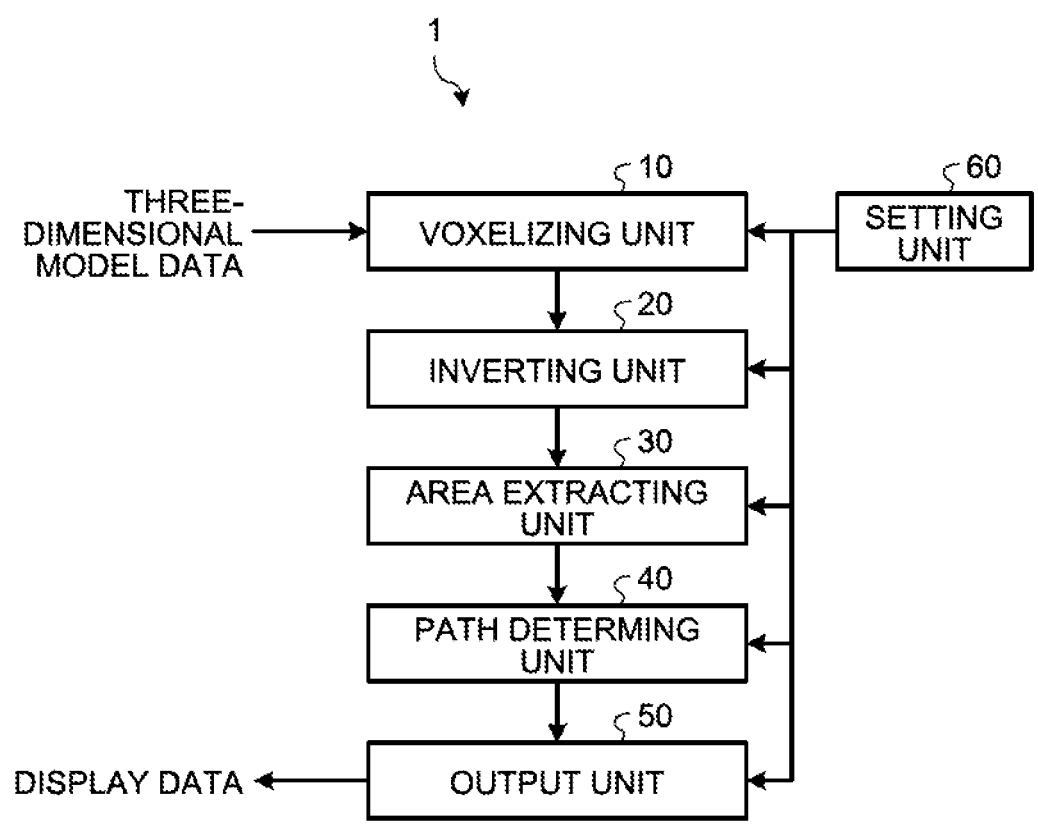
FIG. 1 is a block diagram illustrating an example of a functional configuration of an information processing device according to an embodiment.

FIG. 1 is a block diagram illustrating an example of a functional configuration of the information processing device according to the embodiment. As an information processing device 1 illustrated in FIG. 1, for example, a personal computer (PC) can be applied. The information processing device 1 accepts three-dimensional model (shape) data of a product created by three-dimensional Computer Aided Design (CAD) on a computer. The information processing device 1 performs processing such as exterior extraction of the product based on the accepted three-dimensional model data, and outputs the processing result to a display or the like.

Here, the three-dimensional model data is data indicating shapes of components that constitute the product, and Boundary REPresentation (BREP) and facets or the like can be applied. The BREP expresses a three-dimensional shape of a product with phase information (Body, Face, Loop, CoEdge, Edge, Vertex, etc.) and with geometric information (Base Surface, Base Curve, Base Point, etc.). The facets express a three-dimensional shape of a product with a collection of micro triangles (Body, Face, Triangles, etc.).

As illustrated in FIG. 1, the information processing device 1 includes a voxelizing unit 10, an inverting unit 20, an area extracting unit 30, a path determining unit 40, an output unit 50, and a setting unit 60.

The voxelizing unit 10 voxelizes the original three-dimensional model of a product indicated by the three-dimensional model data of the product to generate a voxel model corresponding to the original three-dimensional model.

A voxel model expresses a three-dimensional shape with a collection of micro cubes (lattices) in XYZ space. In this way, because the voxel model can simply express the three-dimensional shape by presence or absence of micro cubes in XYZ space, it is possible to suppress the processing load applied to various computations as compared with the three-dimensional model data such as the BREP and the facets.

The inverting unit 20 performs inverse voxelization on an area (for example, a cube or a rectangular parallelepiped) of the three-dimensional space including the voxel model generated by the voxelizing unit 10. That is, the inverting unit 20 performs inversion processing for inverting an area set as voxels and an area not set as voxels. A free space (area) other than the area corresponding to the three-dimensional shape is voxelized (set as voxels) by the inverse voxelization.

The area extracting unit 30 extracts an area, in the area set as voxels after the inverse voxelization, which includes a start point and an end point in order to obtain a shortest path and through which the center of a sphere of preset size can pass. In other words, the area to be extracted allows the center of a sphere of preset size to pass anywhere therein. The path determining unit 40 determines the shortest path passing through the two points of the start point and the end point within the area extracted by the area extracting unit 30.

The output unit 50 outputs the processing result of the path determining unit 40, that is, the shortest path, determined by the path determining unit 40, passing through the two points of the start point and the end point within the free space (free area) of the three-dimensional shape. As an example, the output unit 50 outputs the display data for displaying the shortest path. As a result, a user can check the shortest path passing through the two points of the start point and the end point within the free space of the three-dimensional shape.

The setting unit 60 is a user interface that accepts various settings from the user. For example, the setting unit 60 performs various settings by displaying a graphical user interface (GUI) on the display and accepting an operation from the user through the GUI. As an example, the setting unit 60 accepts condition settings for determining the shortest path in the voxelizing unit 10, the inverting unit 20, the area extracting unit 30, and the path determining unit 40. The setting unit 60 also accepts display settings such as setting for the display data to be output in the output unit 50.

Figure 2:
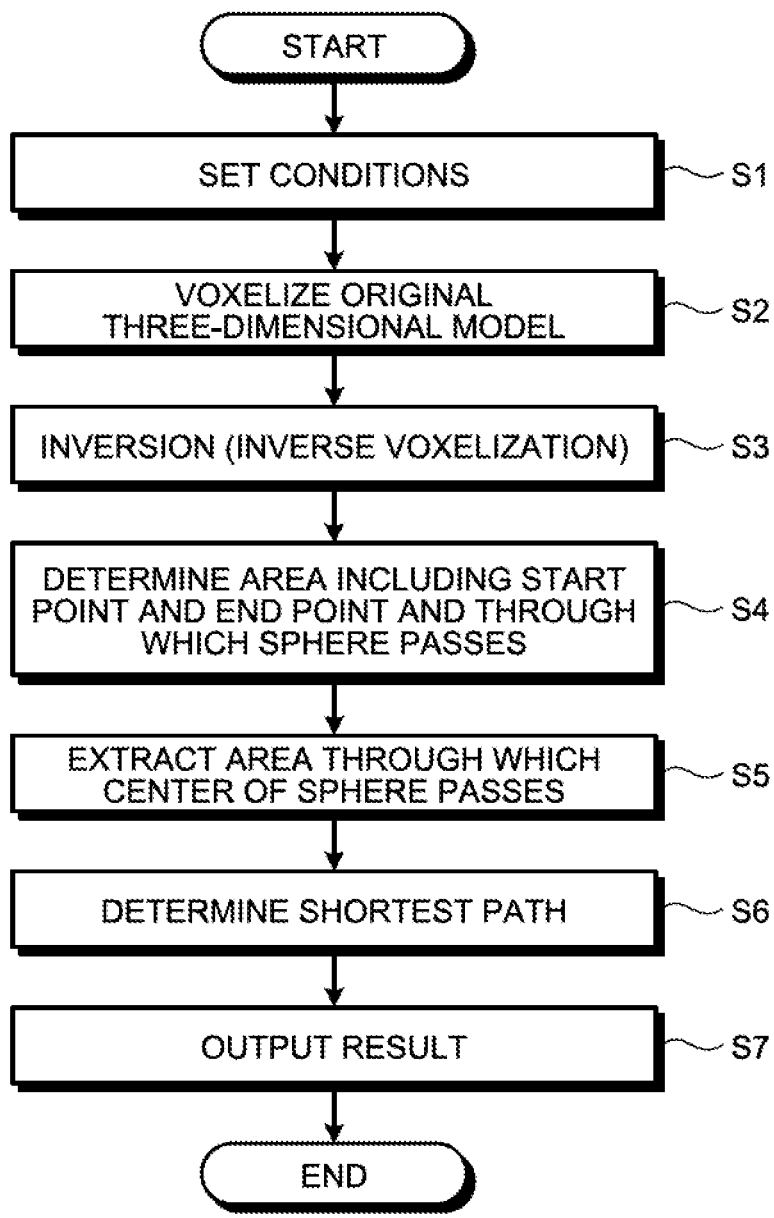
FIG. 2 is a flowchart illustrating an example of an operation of the information processing device according to the embodiment.

Details of the processing in the information processing device 1 will be explained next. FIG. 2 is flowchart illustrating an example of an operation of the information processing device 1 according to the embodiment.

As illustrated in FIG. 2, at the start of the process, the setting unit 60 accepts a condition setting for determining the shortest path based on the operation of the user on the setting screen (S1).

Specifically, the setting unit 60 accepts setting values of voxelization conditions (e.g., voxel pitch) in the voxelizing unit 10. Moreover, the setting unit 60 accepts setting values such as the start point and the end point for determining the shortest path and a margin from the center position on the shortest path, for example, a diameter parameter of a tubing material (pipe) installed along the shortest path.

Following S1, the voxelizing unit 10 voxelizes the three-dimensional model of the product indicated by the original three-dimensional model (shape) data of the product under the condition set at S1 (S2).

Figure 3:
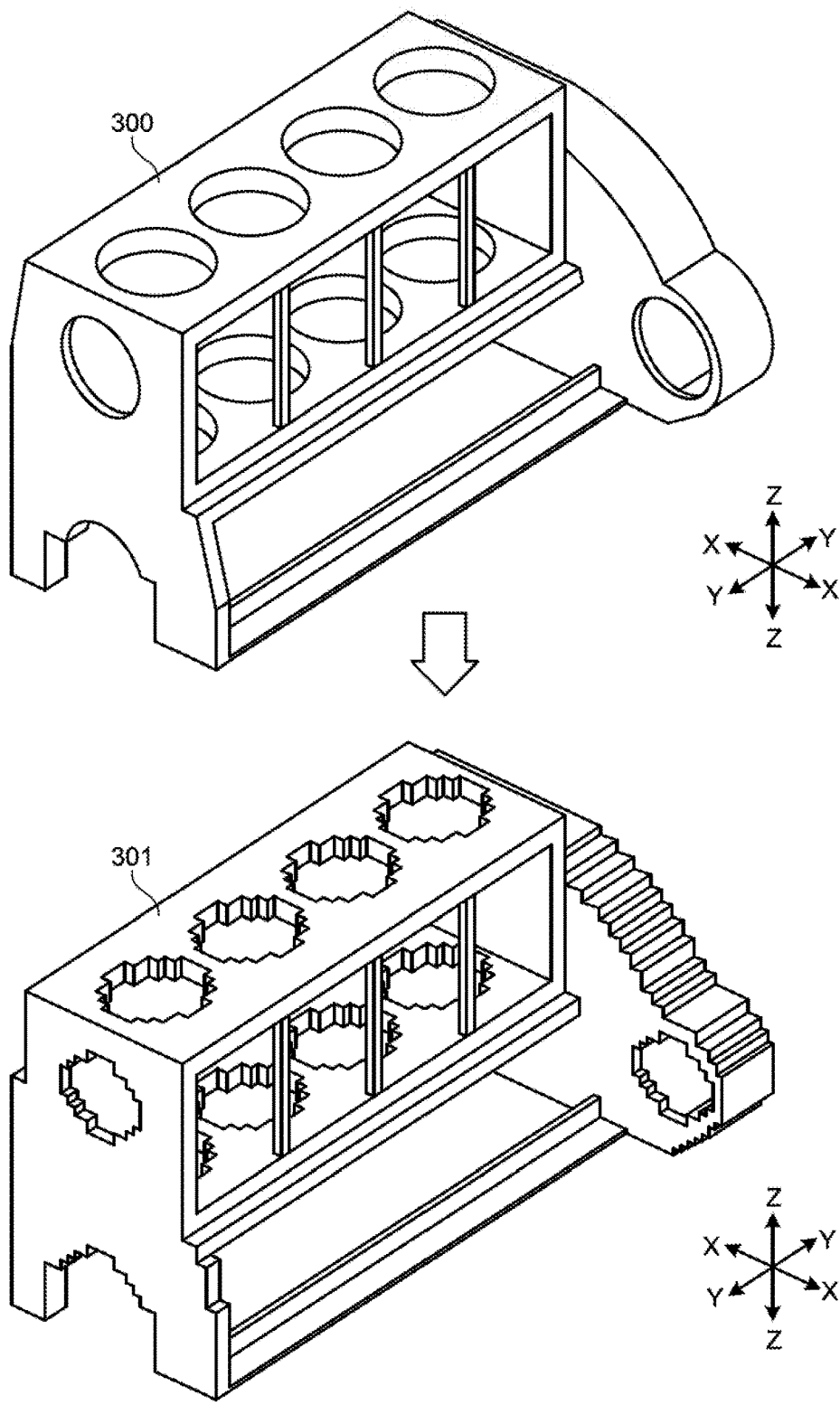
FIG. 3 is an explanatory diagram for explaining how to voxelize an original three-dimensional model.

FIG. 3 is an explanatory diagram for explaining how to voxelize the three-dimensional model. As illustrated in FIG. 3, the voxelizing unit 10 voxelizes an original three-dimensional model 300 indicated by the three-dimensional model (shape) data, and generates a voxel model 301 corresponding to the three-dimensional model 300. This voxelization is performed by using, for example, a known algorithm such as setting an area through which each triangular facet included in the three-dimensional model data passes to "1 (voxel is present)".

Subsequently, the inverting unit 20 performs inversion processing (inverse voxelization) of the voxels on an area in predetermined three-dimensional space including the voxel model 301 generated by the voxelizing unit 10, that is, on an area such as a cube or a rectangular parallelepiped that surrounds the voxel model 301 (S3).

FIG. 4 is an explanatory diagram for explaining inversion (inverse voxelization). The inverting unit 20 inverses the area set as the voxel model 301 and the area not set as the voxel model 301 in a cube 301a including the voxel model 301 generated by the voxelizing unit 10. With this inversion, the free space other than the voxel model 301 corresponding to the original three-dimensional model is extracted as a voxel model 302.

Then, the area extracting unit 30 identifies (extracts) an area through which a sphere of a size preset at S1 or the like passes in the area including the start point and the end point set at S1 within the area set as the voxel model 302 after the inversion at S3 (S4). Subsequently, the area extracting unit 30 extracts an area through which the center of the sphere passes within the identified area through which the sphere passes (S5).

Figure 5:
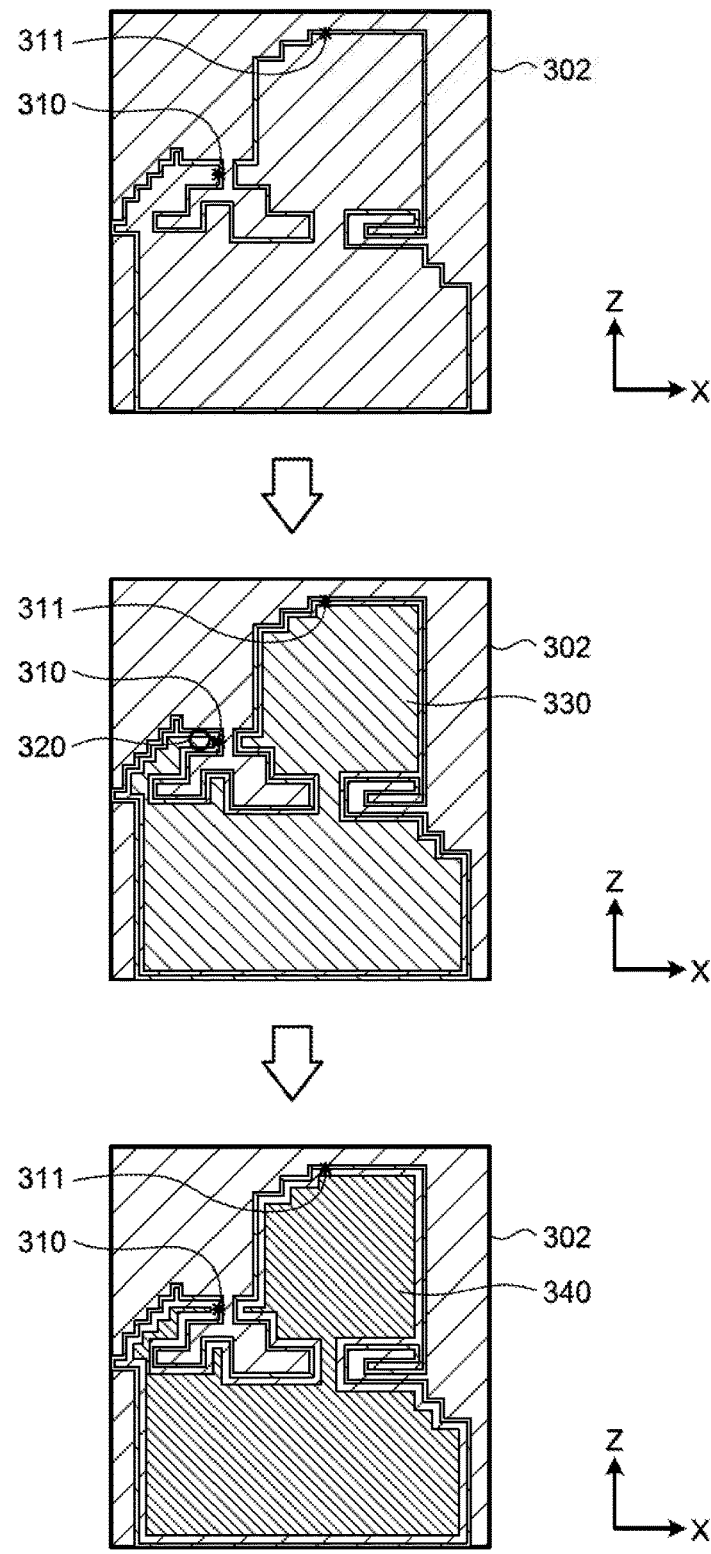
FIG. 5 is an explanatory diagram for explaining how to extract an area which includes a start point and an end point and through which the center of a sphere passes.

FIG. 5 is an explanatory diagram for explaining how to extract the area that includes the start point and the end point and through which the center of the sphere passes. Specifically, FIG. 5 represents a cross section of the voxel model 302 in FIG. 4 in A-A direction.

As illustrated in FIG. 5, a start point 310 and an end point 311 are assumed to be previously set in the voxel model 302 corresponding to the free space other than the voxel model 301 that corresponds to the three-dimensional shape. The area extracting unit 30 identifies (extracts) an area 330 through which a sphere 320 of the size preset at S1 or the like passes in the area including the start point 310 and the end point 311. Specifically, the area extracting unit 30 continuously moves the sphere 320 within the voxel model 302 and identifies the area 330 through which the sphere 320 can continuously pass without protruding from the voxel model 302.

Subsequently, the area extracting unit 30 extracts an area 340 through which the center of the sphere 320 passes based on a trajectory of the sphere 320 moving through the area 330. Because the extracted area 340 is an area through which the center of the sphere 320 passes, the extracted area 340 is separated (has a margin) from the edge of the voxel model 302 by the radius of the sphere 320. Moreover, a space in the voxel model 302 where the sphere 320 does not pass, namely, an area through which a tubing material (pipe) corresponding to the diameter of the sphere 320 does not pass is not extracted. Therefore, by determining the shortest path in the area 340, the tubing material does not interfere with the three-dimensional model 300 in the case where the tubing material is installed along the shortest path.

Following S5, the path determining unit 40 determines a shortest path passing through the two points of the start point 310 and the end point 311 within the area 340 extracted by the area extracting unit 30 (S6).

Figure 6:
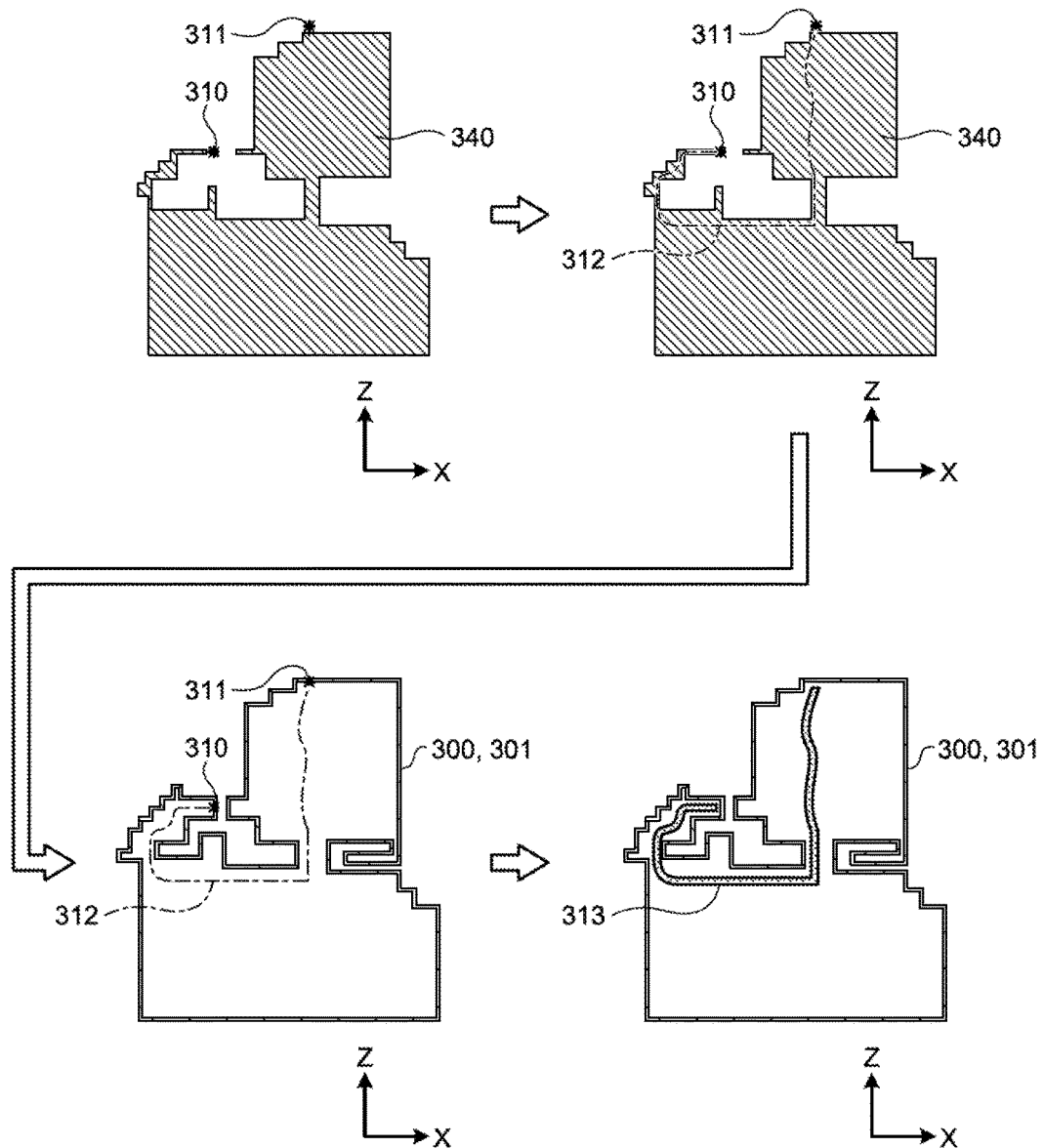
FIG. 6 is an explanatory diagram for explaining how to determine a shortest path.

FIG. 6 is an explanatory diagram for explaining how to determine a shortest path. As illustrated in FIG. 6, the path determining unit 40 determines a shortest path 312 from the start point 310 to the end point 311 within the area 340 by a known method of combining the octree and Dijkstra's method, or the like. Specifically, the path determining unit 40 finds an octree structure of the area 340 and creates a graph structure with the end of the octree structure as a vertex. Then, by applying the Dijkstra's method as an algorism that obtains a shortest path between two nodes of the graph structure to the created graph structure, the path determining unit 40 determines the shortest path 312.

By being determined within the area 340, the shortest path 312 has a margin corresponding to the radius of the sphere 320 from the edge of the voxel model 302. Therefore, as obvious from the arrangement of the three-dimensional model 300 and the voxel model 301 and the shortest path 312 and a tubing material 313 along the shortest path 312 in FIG. 6, the tubing material 313 does not interfere with the voxel model 301 (three-dimensional model 300).

Following S6, the output unit 50 outputs the processing result of the path determining unit 40, that is, the shortest path 312 passing through the two points of the start point 310 and the end point 311 without interference with the three-dimensional model 300 (S7). Specifically, the output unit 50 outputs the shortest path 312 to the display screen or the like.

Figure 7B:
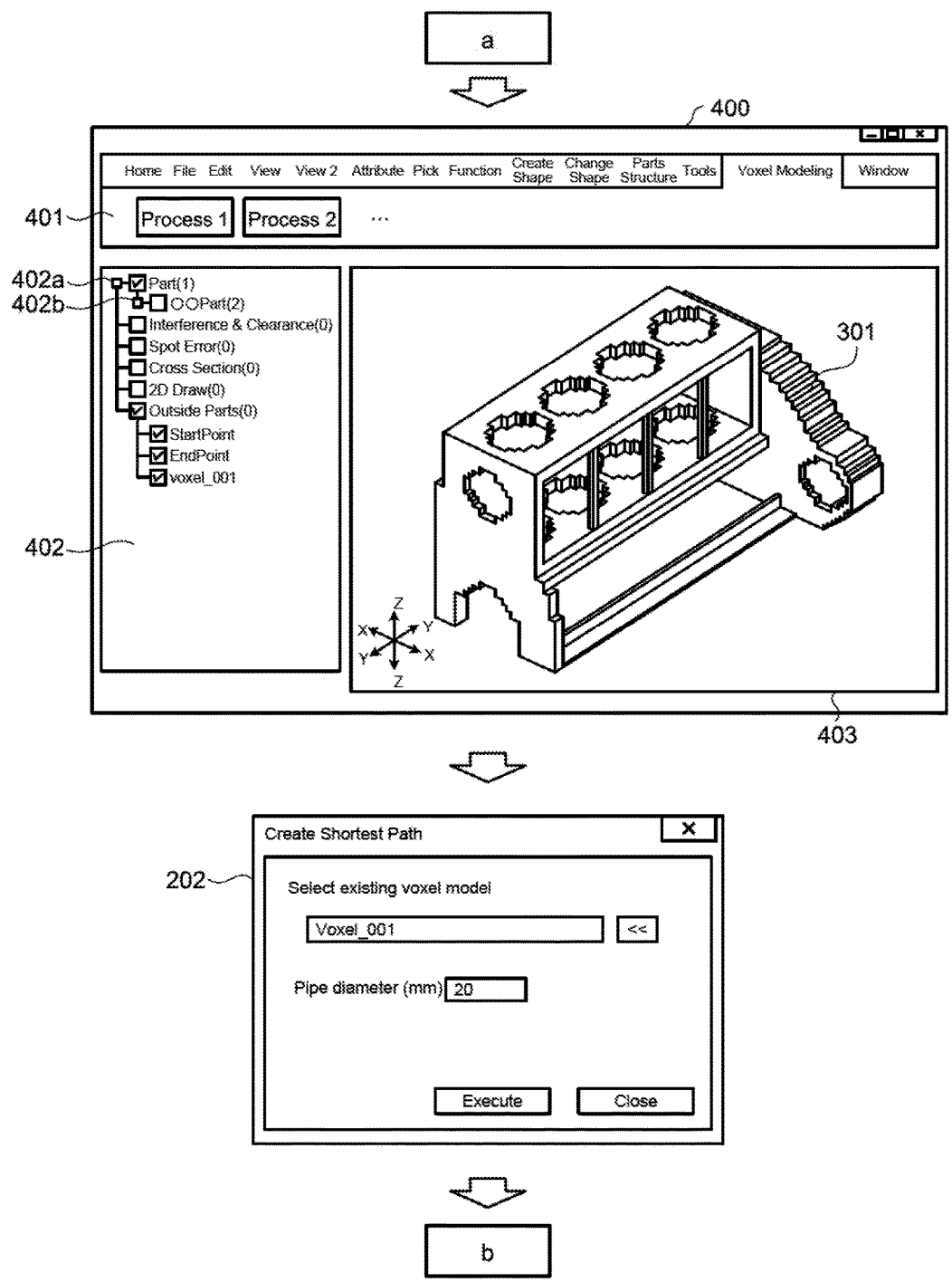
FIG. 7B is an explanatory diagram for explaining display screens.
Figure 7C:
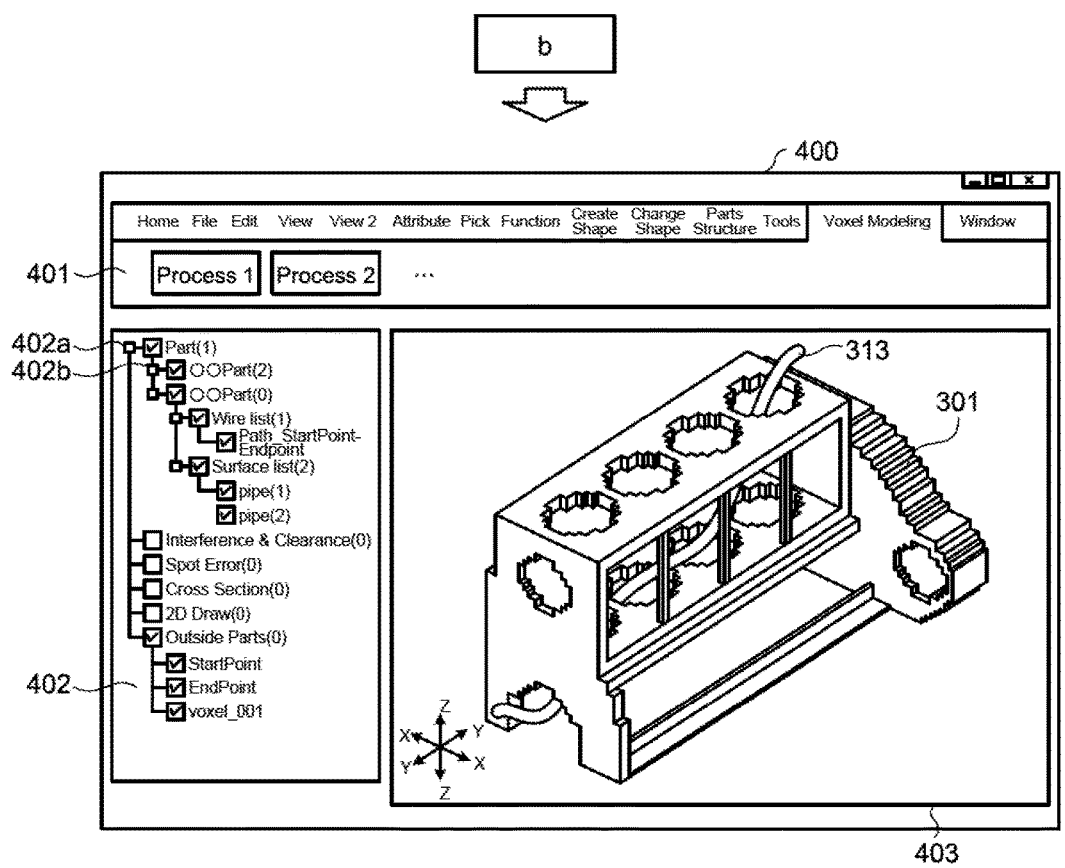
FIG. 7C is an explanatory diagram for explaining a display screen.

FIG. 7A to FIG. 7C are explanatory diagrams for explaining a display screen. As illustrated in FIG. 7A to FIG. 7C, a display screen 400 includes an operation area 401, a tree display area 402, and a three-dimensional model display area 403.

The operation area 401 is an area having various operation buttons, and accepts an operation instruction from the user. The tree display area 402 is an area for displaying a display member displayed in the three-dimensional model display area 403 in a tree form. A branch 402b is set in a tree 402a of the tree display area 402 for each display member displayed in the three-dimensional model display area 403. By checking on/off a checkbox in the branch 402b, the user can instruct whether or not to display the display member in the three-dimensional model display area 403.

As illustrated in FIG. 7A, at first, the user sets voxelization by performing an operation on the operation area 401 through the display screen 400 where the three-dimensional model 300 is displayed in the three-dimensional model display area 403. Specifically, the user invokes a setting screen 201, sets conditions for voxelization, and executes voxelization of the three-dimensional model 300.

Thus, the voxelization is performed on the three-dimensional model 300, and, as illustrated in FIG. 7B, the voxel model 301 corresponding to the three-dimensional model 300 is displayed in the three-dimensional model display area 403. Therefore, the user can confirm the state of the voxel model 301 corresponding to the three-dimensional model 300. The user then pops up a setting screen 202 and sets conditions for determining the shortest path 312 (path of the tubing material 313 installed with the shortest path 312), so that the processing for determining the shortest path is executed.

Thus, the path of the tubing material 313 installed with the shortest path 312 is determined, and, as illustrated in FIG. 7C, the tubing material 313 is displayed with the determined path in the three-dimensional model display area 403. Therefore, the user can easily confirm the path of the tubing material 313 installed with the shortest path 312.

As explained above, the information processing device 1 voxelizes the three-dimensional model 300, generates the voxel model 301 corresponding to the three-dimensional model 300, and performs inverse voxelization on the cube 301a including the voxel model 301. Then, the information processing device 1 extracts the area 340, in the area set as the voxel model 302 after the inverse voxelization, which includes the two points of the start point 310 and the end point 311 and through which the center of the sphere 320 of the predetermined size can pass. Subsequently, the information processing device 1 determines the shortest path 312 passing through the two points of the start point 310 and the end point 311 within the extracted area 340, and outputs the determined shortest path 312 to the display or the like. In this manner, because the information processing device 1 determines the shortest path 312 from the free space other than the three-dimensional shape using the voxel models 301 and 302 capable of easily expressing the three-dimensional shape, it is possible to suppress the processing load applied to various computations as compared with the three-dimensional model data such as BREP or facets.

In addition, the components of the illustrated devices are not necessarily physically configured as illustrated. In other words, the specific mode of distribution and integration of the devices is not limited to the illustrated ones, and all or part of the devices can be configured to be distributed or integrated functionally or physically in arbitrary units according to various loads and usage conditions.

All or arbitrary part of the various processing functions performed by the information processing device 1 may be executed on a central processing unit (CPU) (or on a microcomputer such as a micro processing unit (MPU) or a micro control unit (MCU)). In addition, it is needless to say that all or arbitrary part of the various processing functions may be executed on the program analyzed and executed by the CPU (or by the microcomputer such as MPU or MCU) or on the hardware by wired logic. The various processing functions performed by the information processing device 1 may be executed in cooperation with a plurality of computers by cloud computing.

Figure 8:
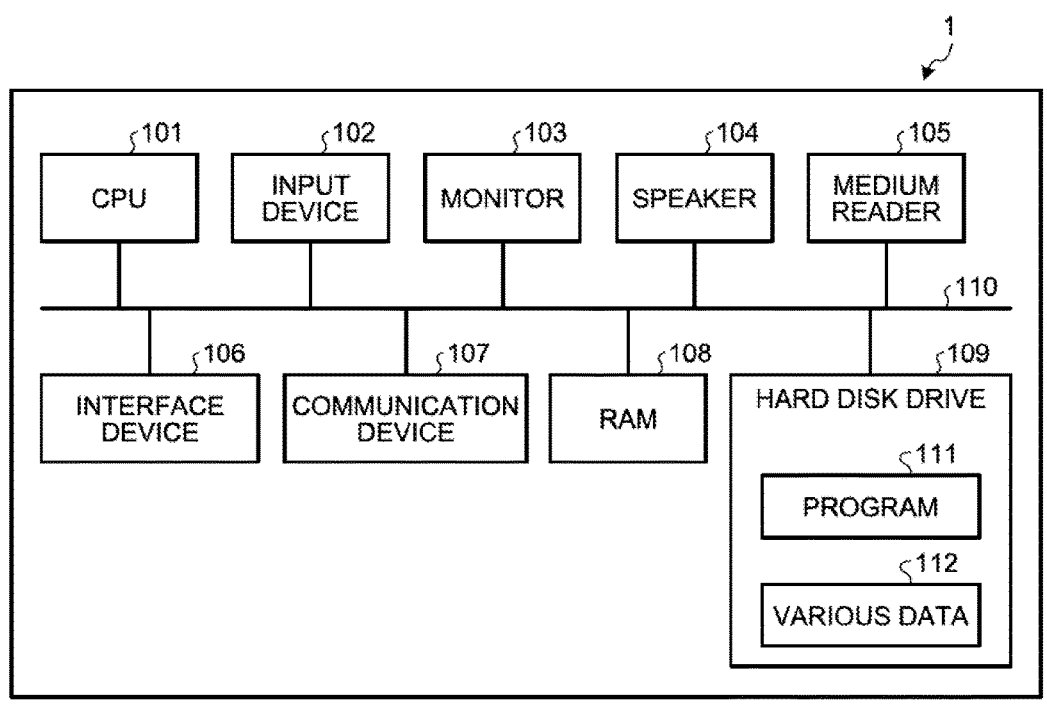
FIG. 8 is a block diagram illustrating an example of a hardware configuration of the information processing device according to the embodiment.

Incidentally, the various types of processing explained in the embodiment can be implemented by a computer executing a prepared program. Therefore, an example of the computer (hardware) that executes the program having the same functions as these of the embodiment will be explained below. FIG. 8 is a block diagram illustrating an example of a hardware configuration of the information processing device 1 according to the embodiment.

As illustrated in FIG. 8, the information processing device 1 includes a CPU 101 that executes various arithmetic processing, an input device 102 that accepts a data input, a monitor 103, and a speaker 104. The information processing device 1 also includes a medium reader 105 that reads a program or the like from a recording medium, an interface device 106 for connecting to the various devices, and a communication device 107 for communicating with an external device by wired or wireless connection. The information processing device 1 further includes random access memory (RAM) 108 that temporarily stores various pieces of information and a hard disk drive 109. The units (101 to 109) of the information processing device 1 are connected to a bus 110.

The hard disk drive 109 stores a program 111 for executing various processing in the voxelizing unit 10, the inverting unit 20, the area extracting unit 30, the path determining unit 40, the output unit 50, and the setting unit 60 explained in the embodiment. Moreover, the hard disk drive 109 stores various data 112 (e.g., three-dimensional model data) referenced by the program 111. The input device 102 accepts, for example, an input of operation information from an operator of the information processing device 1. The monitor 103 displays, for example, various screens (e.g., setting screens 201 and 202, and display screen 400) operated by the operator. The interface device 106 is connected, for example, with a printing device. The communication device 107 is connected to a communication network such as a local area network (LAN), and exchanges various information with an external device via the communication network.

The CPU 101 performs various processing by reading the program 111 stored in the hard disk drive 109, loading the program 111 into the RAM 108, and executing the program. The program 111 does not have to be stored in the hard disk drive 109. For example, the program 111 stored in a storage medium readable by the information processing device 1 may be read and executed. The storage medium readable by the information processing device 1 corresponds to, for example, a portable recording medium such as a compact disk read only memory (CD-ROM), a digital versatile disk (DVD), and a Universal Serial Bus (USB) memory, a semiconductor memory such as a flash memory, and a hard disk drive. It may be configured that the program 111 is stored in a device connected to a public line, the Internet, or LAN, etc. and the information processing device 1 reads the program 111 from any of the devices and execute the program.

According to one aspect of the present invention, it is possible to easily calculate the shortest path between two points passing through a free space from a three-dimensional shape.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium storing a shortest path determining program that causes a computer to execute a process, the process comprising:

voxelizing a three-dimensional model to generate a voxel model;

performing inversion processing on an area in three-dimensional space including the generated voxel model to invert an area set as voxels and an area not set as voxels;

continuously moving a specific sphere having a predetermined size within an area set as voxels after the inversion processing to extract a center-passing area from the area, the center-passing area including specific two points and allowing center of the specific sphere to pass while the specific sphere moves;

determining a shortest path between the specific two points within the extracted center-passing area; and outputting the shortest path.

2. The computer readable recording medium according to claim 1, wherein the specific two points are set according to an input.

3. The computer readable recording medium according to claim 1, wherein the moving includes accepting setting of a diameter parameter, and extracting the center-passing area that allows the center of the specific sphere having a size defined by the diameter parameter to pass while the specific sphere moves.

4. A shortest path determining method comprising:

voxelizing, using a processor, a three-dimensional model to generate a voxel model;

performing, using the processor, inversion processing on an area in three-dimensional space including the generated voxel model to invert an area set as voxels and an area not set as voxels;

continuously moving, using the processor, a specific sphere having a predetermined size within an area set as voxels after the inversion processing to extract a center-passing area from the area, the center-passing area including specific two points and allowing center of the specific sphere to pass while the specific sphere moves;

determining, using the processor, a shortest path between the specific two points within the extracted center-passing area; and outputting the shortest path.

5. An information processing device comprising:

a processor configured to voxelize a three-dimensional model to generate a voxel model, perform inversion processing on an area in three-dimensional space including the generated voxel model to invert an area set as voxels and an area not set as voxels, continuously move a specific sphere having a predetermined size within an area from the area, the center-passing area including specific two points and allowing center of the specific sphere to pass while the specific sphere moves, determine a shortest path between the specific two points within the extracted center-passing area, and output the shortest path.

* * * * *